United States Patent [19]

Pauli et al.

[11] Patent Number: 4,976,943
[45] Date of Patent: Dec. 11, 1990

[54] SPHERICAL, HYDROPHILIC SILICA, METHOD OF ITS PREPARATION AND USE

[75] Inventors: Ingo Pauli, Alzenau; Peter Kleinschmit, Hanau; Rudolf Schwarz, Alzenau-Wasserlos, all of Fed. Rep. of Germany

[73] Assignee: Degussa Aktiengesellschaft, Frankfurt am Main, Fed. Rep. of Germany

[21] Appl. No.: 351,054

[22] Filed: May 12, 1989

[30] Foreign Application Priority Data

May 19, 1988 [DE] Fed. Rep. of Germany ....... 3817045

[51] Int. Cl.$^5$ ............................................. C01B 33/12
[52] U.S. Cl. ...................................... 423/336; 423/335
[58] Field of Search ................................ 423/336, 335

[56] References Cited

FOREIGN PATENT DOCUMENTS 662036 4/1963 Canada ................................ 423/336
13400 12/1955 Fed. Rep. of Germany .
973859 6/1960 Fed. Rep. of Germany .

Primary Examiner—Jeffrey E. Russel
Assistant Examiner—Lori F. Cuomo
Attorney, Agent, or Firm—Beveridge, DeGrandi & Weilacher

[57] ABSTRACT

A spherical, hydrophilic silica consisting of compact, massive, non-crystalline particles without inner pores with a particle size of 0.5 to 10 μm, preferably 0.5 to 4 μm and especially 1 to 3 μm with a BET surface of <50 m$^2$/g, preferably of 1 to 10 m$^2$/g is prepared by heating water vapor and gaseous silicon tetrachloride separately to a temperature of 300° to 400° C., mixing them with each other in a molar ratio of 2:1 to 6.7:1 and reacting the mixture at a temperature of 600° to 1200° C.

2 Claims, 1 Drawing Sheet

SPHERICAL, HYDROPHILIC SILICA, METHOD OF ITS PREPARATION AND USE

INTRODUCTION AND BACKGROUND

The present invention relates to a spherical, hydrophilic silica, the method of its preparation as well as its use.

It is known that silicon tetrachloride and water can be preheated separately to 600° C. and reacted with one another at this temperature over a period of 12 hours. The result is a wettable silica powder with an average particle size of 0.3 μ. The same publication also teaches that water vapor and silicon tetrachloride can be reacted with one another for 5 hours at a temperature of 300° C. This yields a silica powder with an average particle size of 0.2 μm (see DE-A No. D 13 400 IVa/12 of Dec. 29, 1955).

However, the silica powder prepared according to the state of the art has the disadvantage that it is too fine for the intended usage.

SUMMARY OF THE INVENTION

A feature of the present invention resides in spherical, hydrophilic silica consisting of compact, massive, non-crystalline particles without inner pores with a particle size of 0.5 to 10 μm, preferably 0.5 to 4 μm and especially 1 to 3 μm with a BET surface area of $<50$ m$^2$/g preferably of 1 to 10 m$^2$/g.

The spherical, hydrophilic silica of the present invention can be used with advantage as filler in electronic packages or as anti-blocking agent in plastic sheets or foils.

BRIEF DESCRIPTION OF THE DRAWINGS

The present invention will be further understood with reference to the drawing which shows FIG. 1, the particle size distribution according to a preferred embodiment.

DETAILED DESCRIPTION OF THE INVENTION

Figure 1:
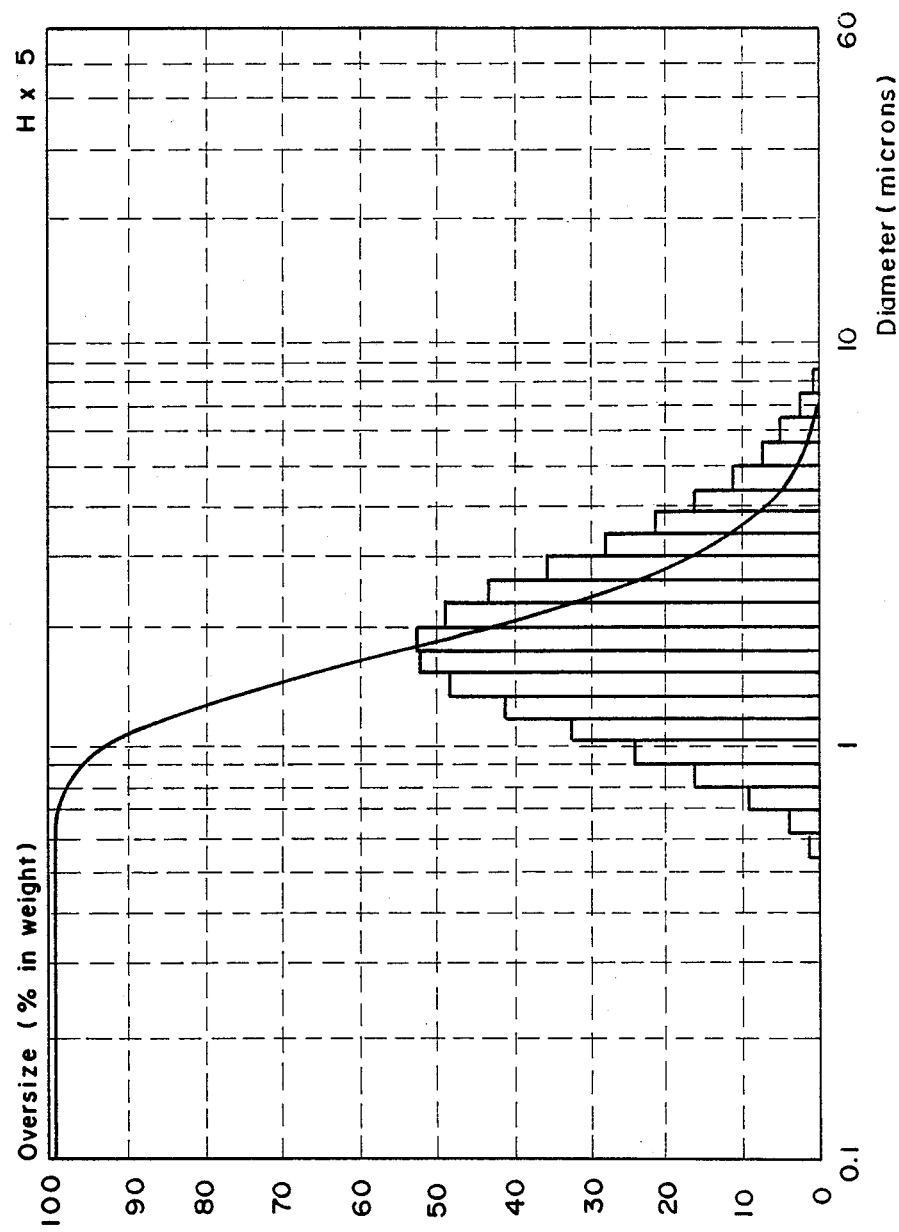

Further subject matter of the invention is constituted by a method of preparing the spherical, hydrophilic silica consisting of compact, massive, non-crystalline particles without inner pores with a particle size distribution of 0.5 to 10 μm, preferably 0.5 to 4 μm and especially 1 to 3 μm, with a BET surface area of $<50$ m$^2$/g, preferably of 1 to 10 m$^2$/g. The method is characterized in that two components; namely, water vapor and gaseous silicon tetrachloride, are heated separately to a temperature of 300° to 400° C., the two aforesaid components are then mixed at a temperature of 300° to 400° C. in a molar ratio of 2:1 to 8:1, preferably 6.9:1, and especially 6.7:1 = H$_2$O:SiCl$_4$. The resulting gaseous mixture is conducted through a narrow prereaction tube heated to a temperature of 600° to 1200° C., then through a wider reaction tube heated to 600° to 1000° C., preferably 700° to 800° C., with a dwell time of $>5$ sec., preferably $>9$ sec. and with a vacuum of at least 100 mm H$_2$O column and the reaction product is separated from the reaction gases.

The silica of the invention can be used with a high degree of filling of 60% in resins used to manufacture electronic packages. Such a capsule for integrated circuits can be formed of an epoxy low-pressure moulding material.

The silica of the intention has the advantage that a degassing of the resinous moulding material can be carried out without foaming.

The following examples illustrate the present invention.

EXAMPLE 1

Silicon tetrachloride and water are converted to gaseous vapor. Both gases are introduced via separate lines in a molar ratio of H$_2$O:SiCl$_4$=1:3 simultaneously and in a continuous manner into a conventional tube reactor. The tube reactor is heated by external heating to a temperature of 730° C.

The dwell time of the two gases in the reactor is 9.53 sec. A vacuum of 100 mm H$_2$O column is maintained in the reactor.

The silicon dioxide obtained exhibits a particle size distribution of 0.5 to 4 μ according to REM and TEM. The specific surface area is 2.3 m$^2$/g.

EXAMPLE 2

Gaseous silicon tetrachloride and water are obtained and mixed in a molar ratio of 1:6.81 at 100°–400° C. The mixture is passed through a conventional prereaction tube heated to 800° C. These gaseous components are subsequently reacted with one another at 700°±20° C.

The silicon dioxide obtained exhibits a particle size distribution according to FIG. 1, determined with a Cilas-Alcatel Granulometer HR 850 163.

The average particle size is 1.86 μm.

The BET surface area is 3.1 m$^2$/g (DIN 66 131).

Further variations and modifications will be apparent to those skilled in the art from the foregoing and are intended to be encompassed by the claims appended hereto.

German priority application No. P 38 17 045.0-41 is relied on and incorporated herein.

We claim:

1. A method of preparing a spherical, hydrophilic silica consisting of compact, massive, non-crystalline particles without inner pores with a particle size of 0.5 to 10 μm, with a BET surface of $<50$ m$^2$/g, characterized in that reactants consisting of water vapor and gaseous silicon tetrachloride are heated separately to a temperature of 300° to 400° C., the water vapor and the gaseous silicon tetrachloride are mixed at a temperature of 300° to 400° C. in a molar ratio of H$_2$O to SiCl$_4$ of 2:1 to 8:1, the resulting gaseous mixture is conducted through a prereaction tube heated to a temperature of 600° to 1200° C., then through a reaction tube wider than said prereaction tube and heated to 600° to 1000° C., with a dwell time of $>5$ sec., and with a vacuum of at least 100 mm H$_2$O column and the reaction product is separated from the reaction gases.

2. The method according to claim 1 wherein said reaction tube is heated to 700° to 800° C.

* * * * *